(12) United States Patent
Jodet et al.

(10) Patent No.: US 11,939,936 B2
(45) Date of Patent: Mar. 26, 2024

(54) THRUST REVERSER CASCADE INCLUDING ACOUSTIC TREATMENT

(71) Applicant: SAFRAN AIRCRAFT ENGINES, Paris (FR)

(72) Inventors: Norman Bruno André Jodet, Moissy-Cramayel (FR); Jéremy Paul Francisco Gonzalez, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 164 days.

(21) Appl. No.: 17/608,311

(22) PCT Filed: Apr. 3, 2020

(86) PCT No.: PCT/EP2020/059569
§ 371 (c)(1),
(2) Date: Nov. 2, 2021

(87) PCT Pub. No.: WO2020/224889
PCT Pub. Date: Nov. 12, 2020

(65) Prior Publication Data
US 2022/0220925 A1 Jul. 14, 2022

(30) Foreign Application Priority Data
May 3, 2019 (FR) ........................ 1904659

(51) Int. Cl.
*F02K 1/72* (2006.01)
*F02K 1/82* (2006.01)
(52) U.S. Cl.
CPC ............... *F02K 1/827* (2013.01); *F02K 1/72* (2013.01)

(58) Field of Classification Search
CPC ... F02K 1/827; F02K 1/44; F02K 1/64; F02K 1/72; F02K 1/74; F02K 1/54; F02K 1/56
See application file for complete search history.

(56) References Cited

U.S. PATENT DOCUMENTS 5,060,471 A * 10/1991 Torkelson ............... F02K 1/827
60/262
5,927,647 A 7/1999 Masters et al.
(Continued)

FOREIGN PATENT DOCUMENTS

EP 1978232 A2 10/2008
EP 1978232 A3 12/2012
(Continued)

OTHER PUBLICATIONS

International Search Report in International Application No. PCT/EP2020/059569, dated Jun. 25, 2020. (3 pages).
(Continued)

*Primary Examiner* — Thomas P Burke
(74) *Attorney, Agent, or Firm* — Bookoff McAndrews, PLLC

(57) ABSTRACT

A cascade type thrust reverser device for a turbomachine of an aircraft, comprising a cascade including first partitions, second partitions intersecting the first partitions, and cavities, and a casing including a housing into which the cascade can be inserted in a first direction, the casing and the cascade being in relative translation with respect to one another in the first direction. The casing comprises a perforated wall intended to be in contact with an air flow and including orifices and wall strips with no orifices and intended to face the first walls of the cascade when the device is in a first position in which the cascade is entirely positioned in the housing.

20 Claims, 8 Drawing Sheets

(56) References Cited

U.S. PATENT DOCUMENTS

| | | | | |
|---|---|---|---|---|
| 9,127,452 | B1* | 9/2015 | Winfield | F02K 1/827 |
| 2004/0045766 | A1* | 3/2004 | Porte | G10K 11/161 |
| | | | | 181/292 |
| 2008/0250770 | A1* | 10/2008 | Emprin | F02K 1/68 |
| | | | | 239/265.31 |
| 2013/0221124 | A1* | 8/2013 | Malecki | F02K 1/72 |
| | | | | 239/265.29 |
| 2015/0252751 | A1* | 9/2015 | Baltas | F02C 7/24 |
| | | | | 60/771 |
| 2018/0245515 | A1* | 8/2018 | Roach | B32B 5/245 |
| 2018/0258956 | A1* | 9/2018 | Marchaj | G10K 11/172 |
| 2019/0257268 | A1* | 8/2019 | Roach | F02K 1/64 |
| 2019/0337632 | A1* | 11/2019 | Berry | F02C 7/045 |
| 2022/0220923 | A1* | 7/2022 | Jodet | G10K 11/172 |

FOREIGN PATENT DOCUMENTS

| | | |
|---|---|---|
| FR | 2898870 A1 | 9/2007 |
| FR | 2912833 A1 | 8/2008 |
| FR | 3039517 A1 | 2/2017 |

OTHER PUBLICATIONS

French Search Report in French Application No. 1904659, dated Jan. 23, 2020. (2 pages).
Written Opinion of the International Searching Authority in International Application No. PCT/EP2020/059569. (6 Pages).

* cited by examiner

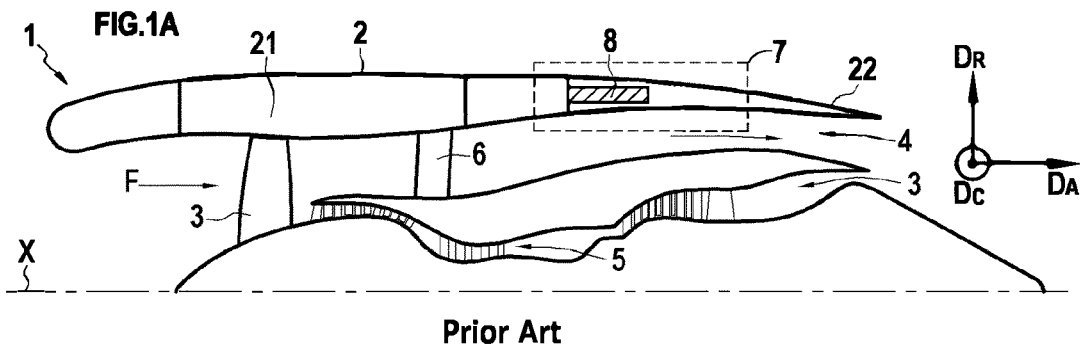
Prior Art
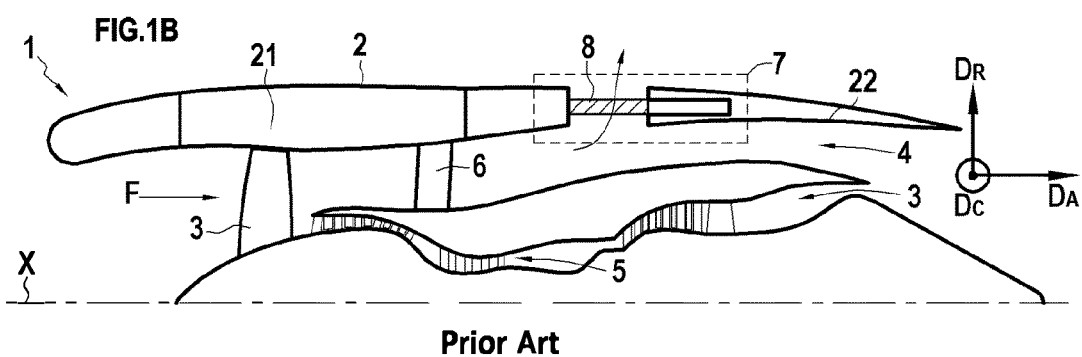
Prior Art
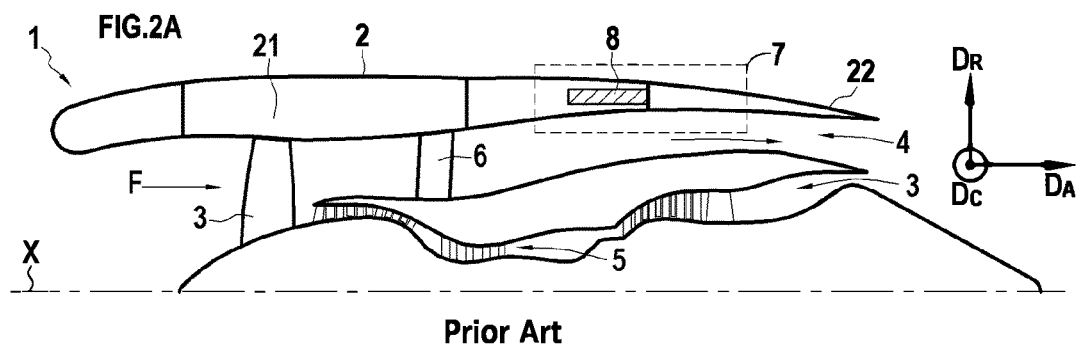
Prior Art
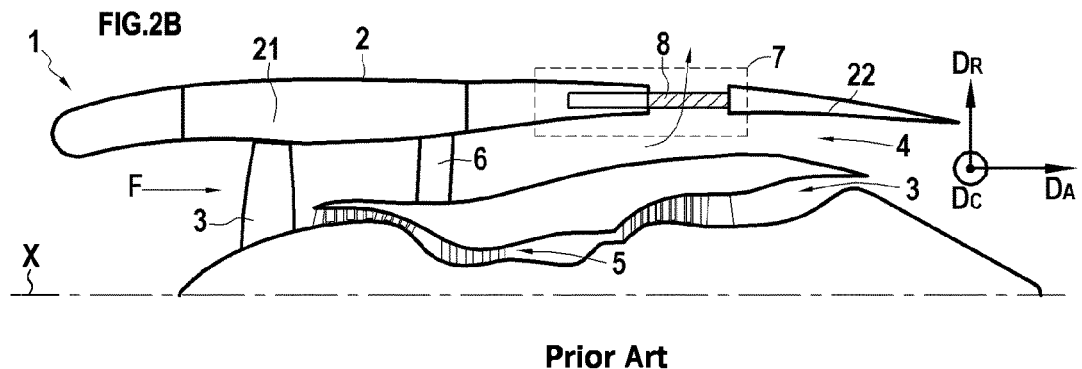
Prior Art

[Fig. 3]
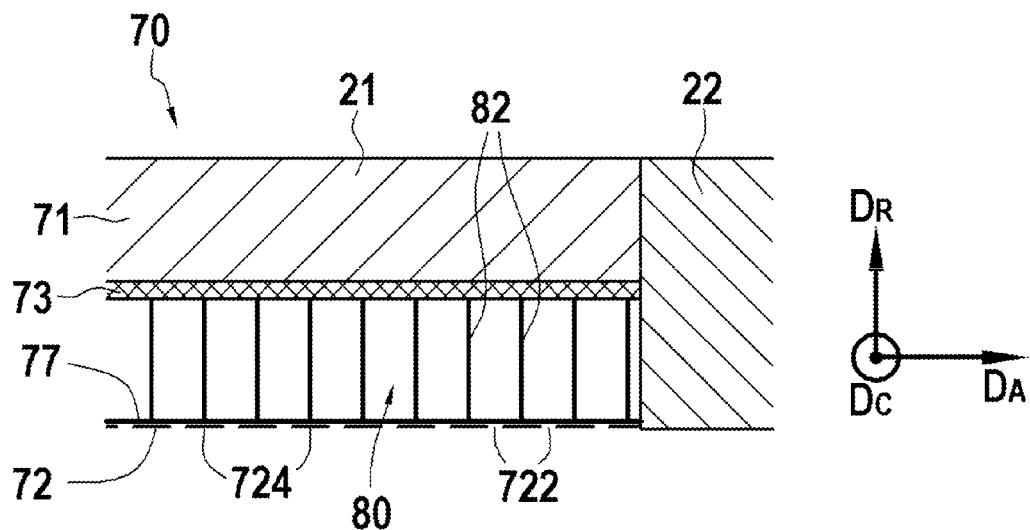
[Fig. 4]
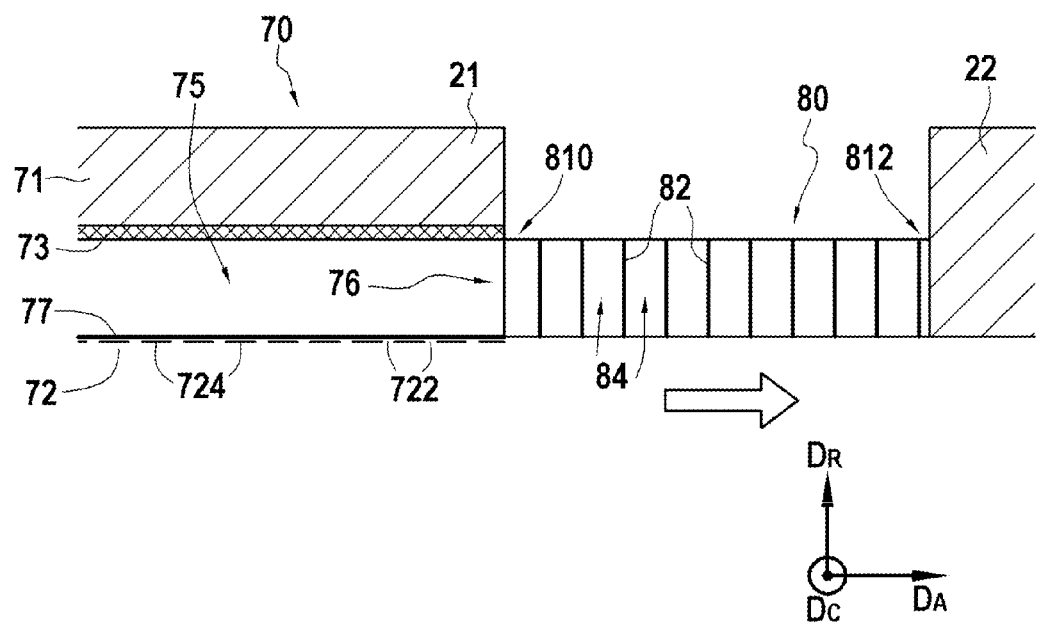

[Fig. 5]
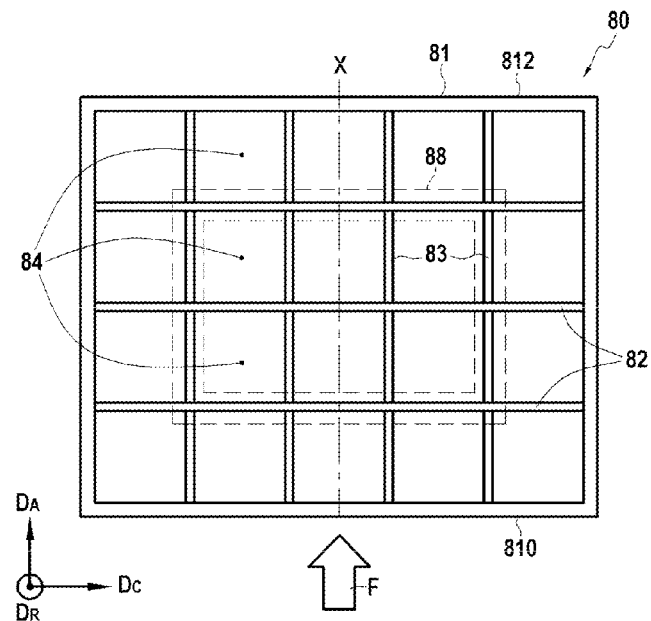
[Fig. 6]
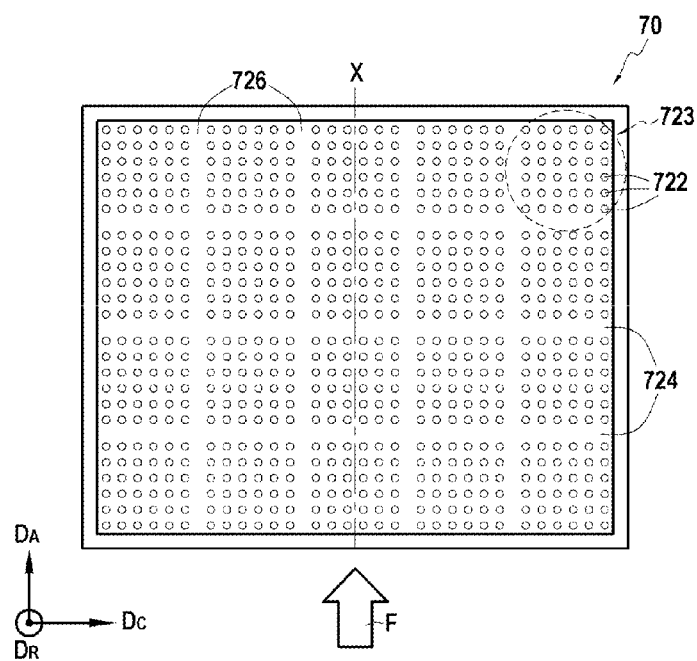

[Fig. 7]
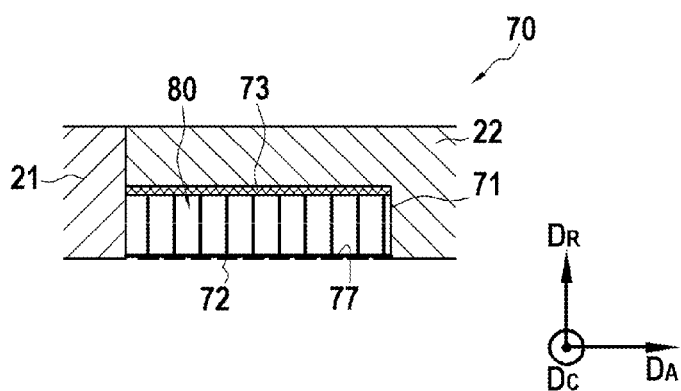
[Fig. 8]
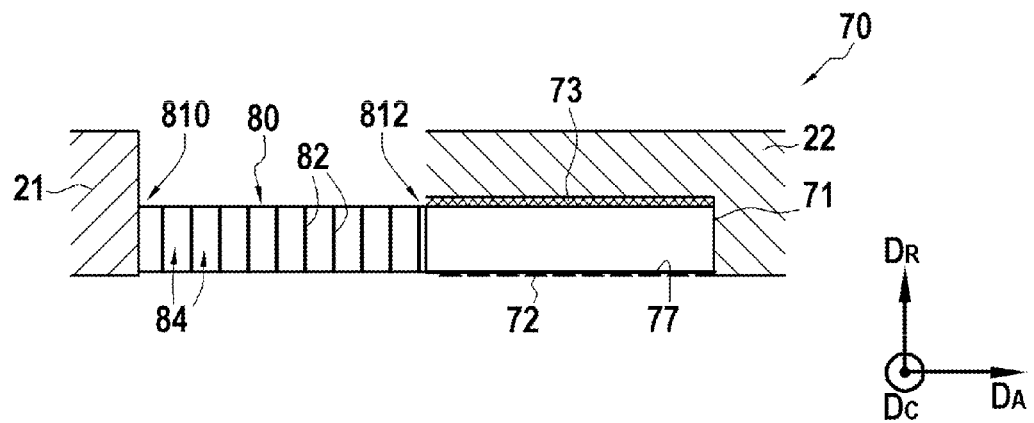

[Fig. 9]
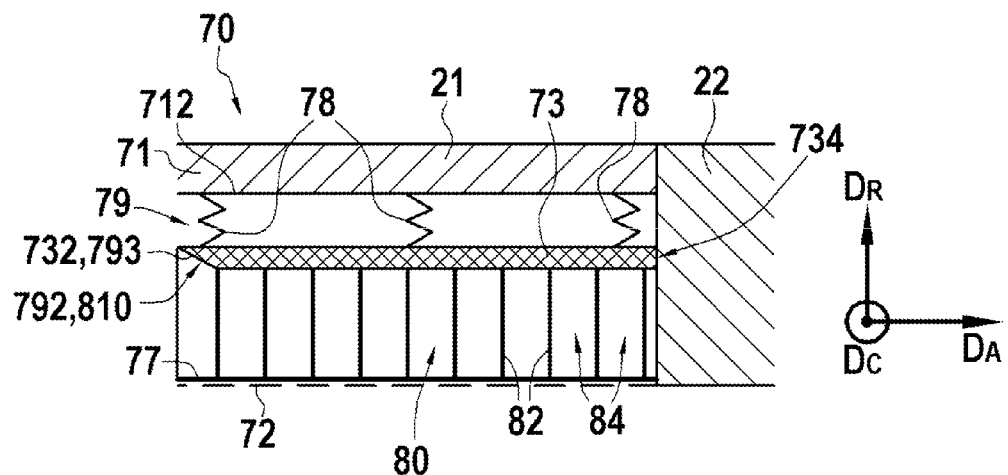
[Fig. 10]
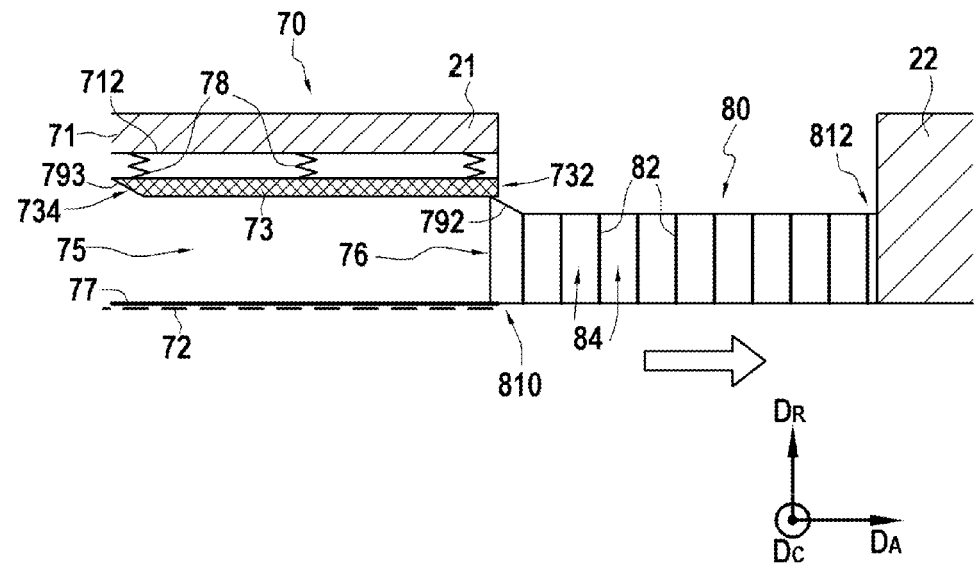

[Fig. 11]
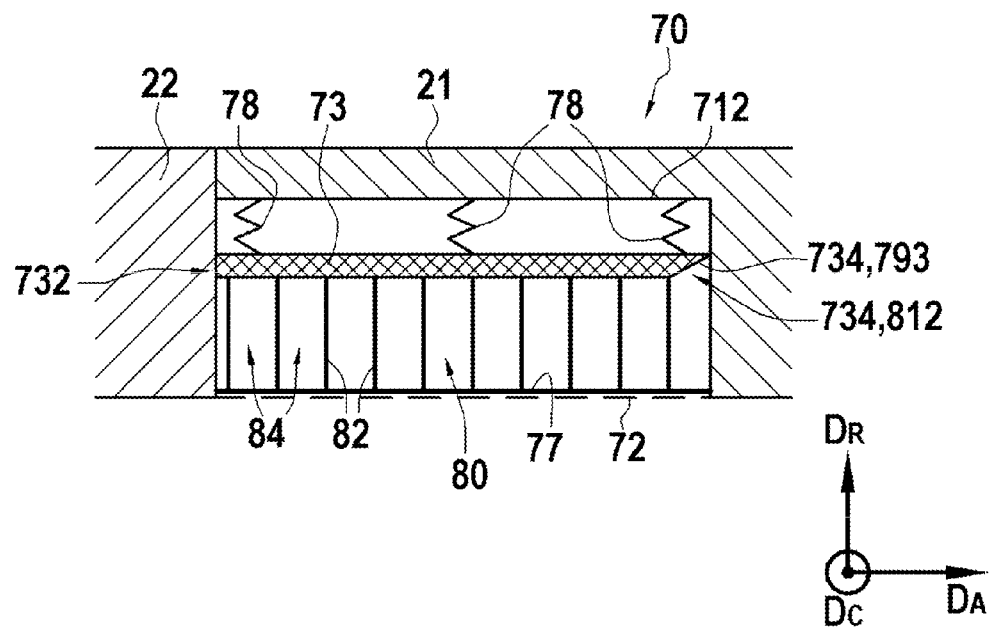
[Fig. 12]
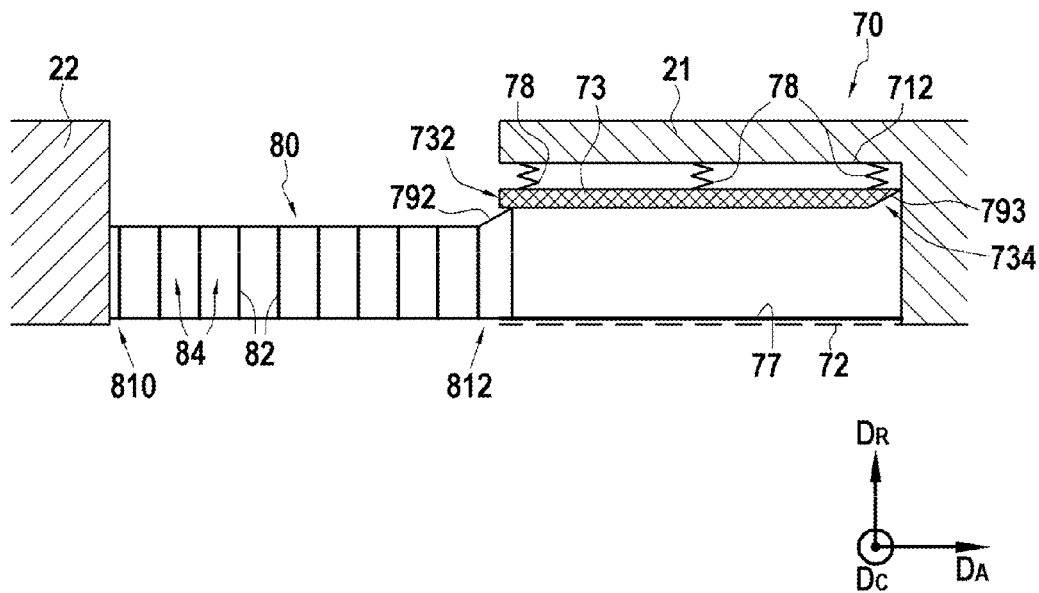

[Fig. 13]
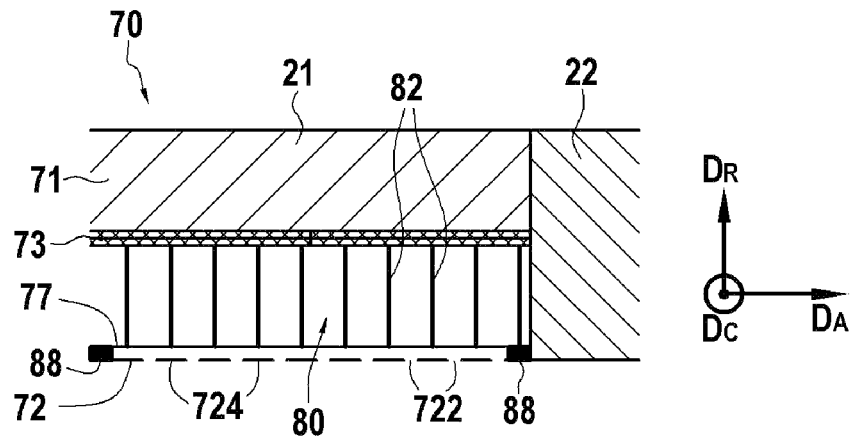
[Fig. 14]
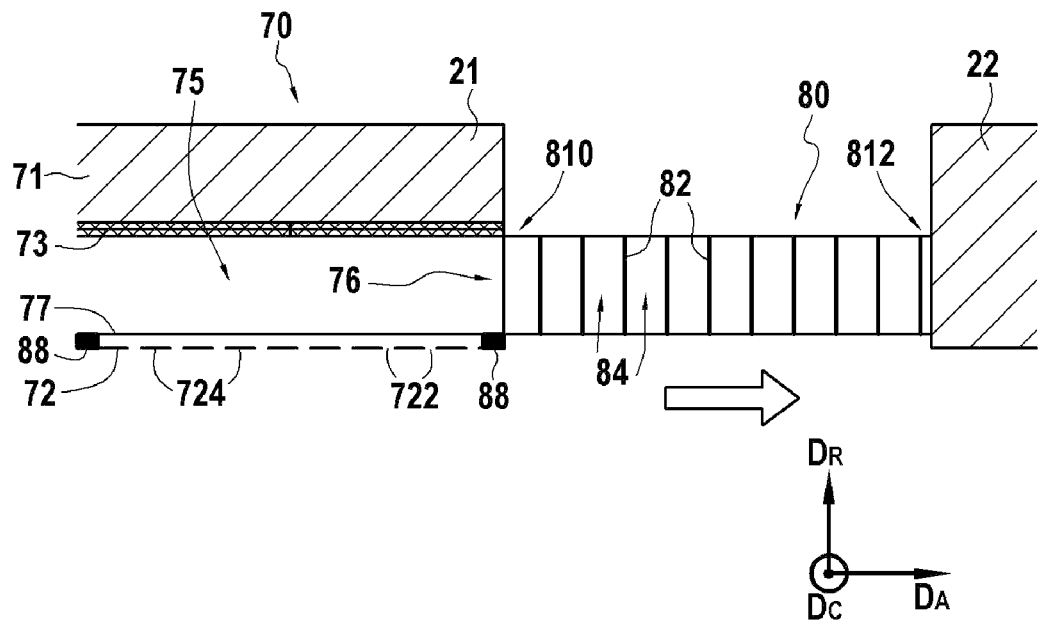

[Fig. 15A]
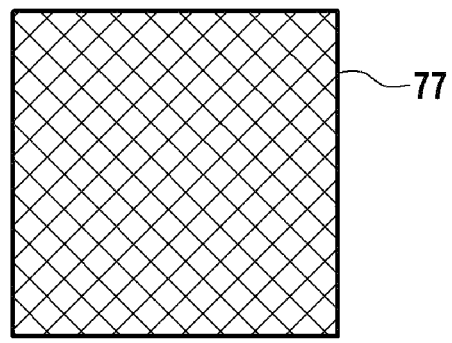
[Fig. 15B]
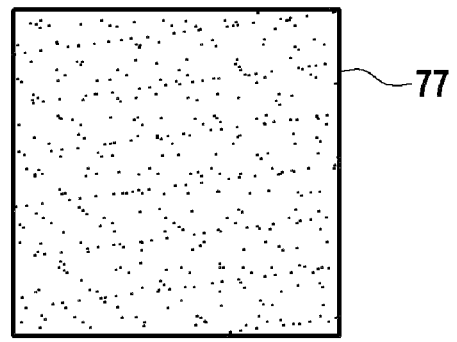
[Fig. 15C]
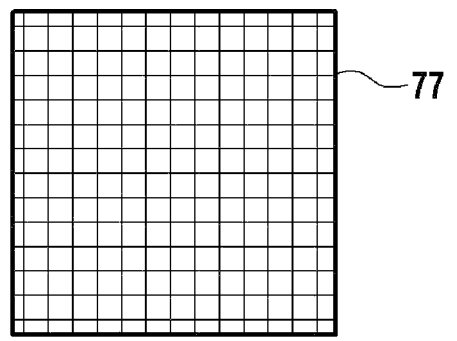

THRUST REVERSER CASCADE INCLUDING ACOUSTIC TREATMENT

CROSS-REFERENCE TO RELATED APPLICATIONS

This application is the U.S. national phase entry under 35 U.S.C. § 371 of International Application No. PCT/EP2020/059569, filed on Apr. 3, 2020, now published as WO 2020/224889 A1, which claims priority to French Patent Application No. 1904659, filed on May 3, 2019.

TECHNICAL FIELD

The invention relates to the acoustic treatment of sound waves emitted by a turbomachine of an aircraft, and more particularly to the treatment of sound waves at the thrust reversers of the turbomachine.

BACKGROUND

When a turbomachine is in operation, the interaction between the flow and the solid portions of the turbomachine are responsible for the generation of noise which propagates on either side of the turbomachine.

One of the means of attenuating this acoustic radiation is to integrated acoustic treatment means in the surfaces in contact with the sound waves.

Conventionally, the acoustic treatment of a turbojet, and more precisely of the noise radiated by the interaction of the rotor and its environment, is accomplished by means of absorbing panels positioned at the wetted surfaces of the duct in which the sound waves propagate. What is meant by wetted surfaces are the surfaces in contact with a fluid flow. These panels are generally composite material of the sandwich type confining a honeycomb forming acoustic absorption cells.

Known for example in the prior art are acoustic panels with a single degree of freedom, or SDOF, which have a conventional honeycomb acoustic treatment structure lining the walls of the nacelle of a turbomachine.

Because of the principle of operation of the technologies of the acoustic treatment panel using resonant cavities, the radial bulk, i.e. the radial thickness, of the acoustic treatment panels depends on the treatment frequency targeted for obtaining the maximum effectiveness in acoustic attenuation.

However, engine architectures increasingly have speeds of rotation of the bladed wheels that are slower and slower, and a number of blades on the bladed wheels that are smaller and smaller, which causes a reduction in the dominant frequencies of the noise associated with the module comprising the fan and the straightener stage, or fan-OGV for "outlet guide vane" module. As a result, matching between the optimal thickness of the acoustic panels and the volume available in the nacelles is currently not satisfied.

To slow down an aircraft, a turbomachine generally comprises thrust reversers. There exist primarily two technologies of thrust reverser that are based on the action of a cascade. Two types of cascade type thrust reversers are distinguished: fixed cascade type thrust reversers and cascade type thrust reversers with a sliding connection.

Schematic section views are shown in FIGS. 1A and 1B in a horizontal plane of a turbomachine 1 according to a first known embodiment of the prior art, respectively in a position in which the thrust reversal is inactivated and in a position in which the thrust reversal is activated.

The turbomachine 1 comprises a nacelle 2 with axial symmetry around an axis X defining an axial direction DA, a radial direction DR and a circumferential direction DC, a fan 3, a primary stream 4, a secondary stream, a primary straightener stage 5, a secondary straightener stage 6, and a cascade type thrust reverser device 7 including a cascade 8.

As illustrated in FIGS. 1A and 1B, which show a turbomachine provided with a fixed cascade type thrust reverser, in fixed cascade thrust reversers the cascade 8 is embedded in, i.e. secured to an upstream portion 21 of the nacelle 2 and in sliding connection with a downstream portion 22 of the nacelle 2, upstream and downstream being defined with respect to the flow direction of a gas flow F in the turbomachine 1. Translating downstream, the downstream portion 22 of the nacelle 2 uncovers the cascade 8 which becomes the only interface between the flow internal to the nacelle 2 and the surrounding medium in which the turbomachine 1 moves.

Schematic section views are shown in FIGS. 2A and 2B in a horizontal plane of a turbomachine 1 according to a second embodiment of the prior art, respectively in a position in which the thrust reversal is inactivated and in a position in which the thrust reversal is activated.

As illustrated in FIGS. 2A and 2B which show a turbomachine 1 provided with a cascade type thrust reverser with a sliding connection, in a fixed cascade thrust reverser the cascade 8 is in sliding connection with respect to the upstream portion 21 of the nacelle 2 and in embedded connection with respect to the downstream portion 22 of the nacelle 2. Translating downstream, the downstream portion 22 of the nacelle drives the cascade 8 out of the nacelle 2 to position it at the interface between the flow internal to the nacelle 2 and the ambient medium.

Thrust reversers represent both a cost, a mass and a bulk that are very penalizing for the performance of the propulsive assembly, while they are used only at the end of the landing phase. The volume that they use in the nacelle can in particular not be used in the prior art, for acoustic treatment of the sound waves emitted by the turbomachine.

In the propulsive assembly architectures using door type thrust reversers which are deployed inside the secondary flow to deflect the flow upstream outside the nacelle, a known practice for integrated the conventional acoustic treatment consists of integrating acoustic panels in the cavities of the reverser doors. This practice consists simply of integrating conventional absorbing panels into the available volumes, as is done in the fan casing.

DISCLOSURE OF THE INVENTION

The invention seeks to supply a cascade type thrust reverser which allows both reorienting a flow of air upstream of the turbomachine outside the nacelle and minimizing the head losses through the cascade when the thrust reversal is activated, and controlling the effectiveness of acoustic absorption when the thrust reversal is inactive.

One object of the invention proposes a cascade type thrust reverser device for a turbomachine of an aircraft. The device comprises a thrust reverser cascade and a casing. The cascade extends in a first plane defining a first direction and a second direction and includes first partitions positioned successively in the first direction and parallel to one another, second partitions intersecting said first partitions and each extending in planes parallel to one another and parallel to the first direction, and cavities each defined by two first partitions and two second partitions. The casing comprises an opening extending in a plane orthogonal to said first direction and a housing in which the cascade can be inserted in said first direction via said opening. The casing and said cascade are in relative translation with respect to one another in the first direction between a first position of the device in which the cascade is entirely positioned in the housing and a second position of the device in which said cascade is at least partially outside said housing.

According to a general feature of the invention, the casing comprises a perforated wall intended to be in contact with an air flow and to be positioned between said air flow and the cascade when the device is in the first position.

Preferably, the perforated wall includes a plurality of orifices and a plurality of wall strips with no orifices and intended to face the first walls of the cascade when the device is in the first position, at least one orifice being positioned between two successive wall strips in the first direction and facing a cavity when the device is in the first position.

The thrust reverser cascade can be formed by an annular one-piece cascade or by a plurality of cascade sections which can be assembled together to form a hollow cylinder with a circular or polygonal base.

When the cascade type thrust reverser device is mounted on the turbojet, the first direction corresponds to an axial direction of the turbojet and the second direction corresponds to a circumferential direction of the turbojet when the cascade is at least partially annular or to a direction tangent to the circumferential direction when the cascade is plane, not curved in other words.

The first partitions are intended to be oriented in a direction intersecting the flow direction of a gas flow inside a turbomachine including a cascade type thrust reverser device of this type. When the thrust reverser device is mounted on a turbomachine, the first partitions, oriented in an azimuthal or radial direction of the turbomachine, are indispensable for guaranteeing the functionality of thrust reversal. It is in fact due to these first partitions that the air flow circulating in a stream, inside the nacelle in which the thrust reverser device is mounted, can be captured and reoriented upstream of the turbomachine, with respect to the flow direction inside the nacelle, outside the nacelle. The second partitions are intended to be oriented in the direction of gas flow inside a turbomachine including a cascade type thrust reverser device of this type. When the thrust reverser device is mounted on a turbomachine, the second partitions, oriented in an axial direction of the turbomachine, are not indispensable for the functionality of thrust reversal. On the other hand, they allow the formation of resonant cavities allowing attenuating the acoustic waves generated by the turbomachine.

When the thrust reverser device according to the invention is mounted on a turbomachine and is in the first position, the device allows, on the one hand, having the cavities formed by the reverser cascade communicate with the fluid medium of the secondary flow of the turbomachine and, on the other hand, providing quality contact between the reverser cascade and the material(s) located at the interface with the fluid medium of the secondary flow.

When the thrust reverser device according to the invention is mounted on a turbomachine and in the first or the second position, the device allows guaranteeing its aerodynamic sealing.

In a first aspect of the thrust reverser device, the casing can also comprise a porous interface formed by at least one layer of porous material and positioned at the interface between the perforated wall and the cascade when the thrust reverser device is in the first position.

The addition of a porous interface allows improving the interface between the thrust reverser cascade and the perforated wall by providing better sealing at the junctions between the partitions of the thrust reverser cascade and the wall strips, which offering useful clearance for improving the sliding of the thrust reverser cascade at the time when the thrust reverser function is used, i.e. when the device is in the second position.

In a second aspect of the thrust reverser device, the porous interface can have a thickness comprised between 0.2 and 2 mm, the thickness extending in a third direction perpendicular to said first plane.

In a third aspect of the thrust reverser device, a layer of porous material of the porous interface can comprise a web or a foam or a material with a cellular structure.

In a fourth aspect of the thrust reverser device, the device can also comprise a sealed frame positioned in the housing between the perforated wall and the cascade when the device is in the first position, on the periphery of the perforated wall in the first plane.

The sealing frame defines a contact surface which forms a span. This span allows guaranteeing the aerodynamic sealing of the device and thus avoiding any leak which penalizes the performance of the turbomachine.

In a fifth aspect of the thrust reverser device, the distance separating two first partitions in the first direction and the distance separating two second partitions in the second direction can each be defined as a function of the frequencies of the sound waves to be treated by said cavities.

The thrust reverser cascade can thus be dimensioned to tune the cavities to the frequencies of the sound waves radiated by the turbomachine in which the thrust reverser device is mounted, and in particular with respect to the frequencies of the sound waves radiated by the pair formed by the fan and the straightener vane stage of the turbomachine.

To this end, the following relation is used, which is valid for the dimensioning of a conventional Helmholtz resonator.

$$F = \frac{C}{2\pi}\sqrt{\frac{S}{Vl'}} \qquad \text{[Math. 1]}$$

With F the tuning frequency in Hertz, C the speed of sound in meters per second, S the cross section area of the neck in square meters, V the volume of the resonant cavity in meters, and l' the corrected length of the neck, the neck being formed by an orifice of the perforated wall facing a cavity. The corrected length of the neck l' being calculated based on the sum of the geometric length of the neck l in a direction perpendicular to the plane in which the perforated wall extends with the channel correction d where, for juxtaposed resonators:

$$d = 1.7r\left(1 - 0.7\sqrt{s}\right) \qquad \text{[Math. 2]}$$

with r the radius of an orifice, and s the level of perforation.

In the case of simple resonator type operation, the volume V corresponds to the volume of the cavities formed by the structure of the thrust reverser cascade.

In a sixth aspect of the thrust reverser device, the first partitions of the cascade can have a height comprised between 10 mm and 300 mm.

In a seventh aspect of the thrust reverser device, the first partitions can comprise a thickness comprised between 0.5 and 5 mm to be sufficiently thick to withstand the loads to which they are subjected, but also as thin as possible to minimize the mass and the head losses in the cascade. The thickness of the first partitions is measured at a given point of the second partition, perpendicular to the tangent to the surface at this point of the second partition.

In an eight aspect of the thrust reverser device, the casing also comprises an acoustically reflecting wall movable in a third direction orthogonal to said first plane and positioned parallel to the first plane between an outer wall and the cascade when the device is in the first position, the outer wall being intended to be in contact with a nacelle of a turbomachine when the device is mounted in a turbomachine.

The acoustically reflecting wall allows ensuring the operation of cavities as resonant cavities.

In a ninth aspect of the thrust reverser device, the acoustically reflecting wall can have a thickness in a third direction greater than 2 mm so that is has sufficient inertia to reflect acoustic waves.

In a tenth aspect of the thrust reverser device, the casing can comprise elastic means mounted between the outer wall and the acoustically reflecting wall and configured to push said acoustically reflecting wall toward the cascade.

The pressure retention of the acoustically reflecting wall against the cascade when the device is in the first position allows ensuring good acoustic sealing of the resonant cavities formed by the cascade, the perforated wall and the acoustically reflecting wall.

In an eleventh aspect of the thrust reverser device, the acoustically reflecting wall has dimensions at least equal to the dimensions of the cascade in said first plane to cover all the cavities of the cascade and thus maximize the acoustic treatment when the device is in the first position.

In a twelfth aspect of the thrust reverser device, the casing can comprise an actuator configured to disengage the acoustically reflecting wall from the cascade when the device is in the second position.

The use of an actuator for disengaging the acoustically reflecting wall from the cascade during the actuation of the thrust reverser device so that it passes from the first position to the second position or conversely allows optimizing the compactness of the thrust reverser device and therefore of the turbomachine comprising said device.

The actuator can comprise at least two devices complementary to one another operating in translation or in rotation, distributed azimuthally at the axial ends of the acoustically reflecting wall. When the thrust reverser device is mounted in a turbomachine, the actuator can be communalized with the translation system of the nacelle.

In a thirteenth aspect of the thrust reverser device, the acoustically reflecting wall can comprise at least one layer of flexible material.

The flexible material can be a polymer. The production of the acoustically reflecting wall of flexible material allow ensuring good sealing at its interface with the thrust reverser cascade.

In a fourteenth aspect of the thrust reverser device, that acoustically reflecting wall can comprise a stack of a plurality of layers of at least two different materials.

The use of a stack of layers of possibly different materials for producing an acoustically reflecting wall allows obtaining different combinations of useful properties for accomplishing different function relating for example to overall stiffness, or to the flexibility of the interface at the contact with the cascade to improve sealing.

In a fifteenths aspect of the thrust reverser device, the acoustically reflecting wall can be made in a single piece.

The advantage of an acoustically reflecting wall in a single piece resides in the simplicity of implementation, because it allows not having to manage alignments between the acoustically reflecting wall and the cascade.

In a sixteenth aspect of the thrust reverser device, the acoustically reflecting wall can be segmented into at least two pieces/

The advantage of an acoustically reflecting wall segmented into a plurality of pieces is not having any limitation on the stiffness of the material which constitutes the acoustically reflecting wall.

In a seventeenth aspect of the thrust reverser device, the cascade can be movable and the casing fixed to use the thrust reverser device in a turbomachine provided with a cascade type thrust reverser with a sliding connection or the cascade can be fixed and the casing movable to use the thrust reverser device in a turbomachine provided with a fixed cascade thrust reverser.

In another object of the invention, a turbomachine intended to be mounted on an aircraft is proposed, the turbomachine comprising an axially symmetrical nacelle defining an axial direction and a radial direction, the nacelle including a thickness in the radial direction and a housing extending in the axial direction in its thickness to receive a cascade of a cascade type thrust reverser device.

According to a general feature of this object of the invention, the turbomachine can comprise a cascade type thrust reverser device as defined above, the cascade being positioned, when thrust reversal is not required, in the corresponding housing of the nacelle of the turbomachine.

In another object of the invention, an aircraft is proposed comprising at least one turbomachine as defined above.

BRIEF DESCRIPTION OF THE DRAWINGS

The invention will be better understood, upon reading performed hereafter, by way of indication and without limitation, with reference to the appended drawings in which:

FIGS. 1A and 1B, already described, show schematic section views in a longitudinal plane of a turbomachine according to a first known embodiment of the prior art, respectively in a position in which the thrust reversal is inactive and in a position in which the thrust reversal is activated.

FIGS. 2A and 2B, already described, show schematic section views in a longitudinal plane of a turbomachine according to a second known embodiment of the prior art, respectively in a position in which the thrust reversal is inactive and in a position where the thrust reversal is activated.

FIG. 3 shows a schematic section view in a plane comprising the axial direction and the radial direction of a cascade type thrust reverser device in a position in which the thrust reversal is inactive according to a first embodiment of the invention.

FIG. 4 shows a schematic section view in a plane comprising the axial direction and the radial direction of a cascade type thrust reverser device in a position in which the thrust reversal is activated according to a first embodiment of the invention.

FIG. 5 illustrates schematically a section view in a plane comprising the axial direction and the circumferential direction of a cascade of the thrust reverser device of FIGS. 3 and 4.

FIG. 6 illustrates schematically a front view in the radial direction of a perforated wall of the thrust reverser device of FIGS. 3 and 4.

FIG. 7 shows a schematic section view in a plane comprising the axial direction and the radial direction of a thrust reverser device in a position in which the thrust reversal is inactive according to a second embodiment of the invention.

FIG. 8 shows a schematic section view in a plane comprising the axial direction and the radial direction of a cascade type thrust reverser device in a position in which the thrust reversal is activated according to a second embodiment of the invention.

FIG. 9 shows a schematic section view in a plane comprising the axial direction and the radial direction of a cascade type thrust reverser device in a position in which the thrust reversal is inactive according to a third embodiment of the invention.

FIG. 10 shows a schematic section view in a plane comprising the axial direction and the radial direction of a cascade type thrust reverser device in a position in which the thrust reversal is activated according to a second embodiment of the invention.

FIG. 11 shows a schematic section view in a plane comprising the axial direction and the radial direction of a cascade type thrust reverser device in a position in which the thrust reversal is inactive according to a fourth embodiment of the invention.

FIG. 12 shows a schematic section view in a plane comprising the axial direction and the radial direction of a cascade type thrust reverser device in a position in which the thrust reversal is activated according to a fourth embodiment of the invention.

FIG. 13 shows a schematic section view in a plane comprising the axial direction and the radial direction of a cascade type thrust reverser device in a position in which the thrust reversal is inactive according to another embodiment of the invention.

FIG. 14 shows a schematic section view in a plane comprising the axial direction and the radial direction of a cascade type thrust reversal cascade is active according to another embodiment of the invention.

FIG. 15A shows a porous interface according to an embodiment of the invention.

FIG. 15B shows a porous interface according to another embodiment of the invention.

FIG. 15C shows a porous interface according to another embodiment of the invention.

DESCRIPTION OF THE EMBODIMENTS

Shown in FIGS. 3 and 4 are schematic section views in a plane comprising the axial direction and the radial direction of a cascade type thrust reverser device mounted on an aircraft turbomachine according to the first embodiment of the invention and respectively in a position in which the thrust reversal is inactive and in a position in which the thrust reversal is activated.

In FIGS. 3 and 4, the turbomachine 1 comprises a thrust reverser device 70 which can operate according to the operation described in FIGS. 2A and 2B. The turbomachine 1 comprises a nacelle 2 with axial symmetry around an axis X defining an axial direction DA, a radial direction DR and a circumferential direction DC.

The thrust reverser device 70 comprises a plurality of cascades 80 assembled to form a cascade ring. The ring can have a cylindrical base or a polygonal base, the cascades 80 extending respectively either in a curved plane comprising the axial direction DA and the circumferential direction DC of the turbomachine, or in a straight plane comprising the axial direction DA and a direction tangent to the circumferential direction DC.

In the embodiments illustrated, the cascades 80 are curved to facilitate the explanation and the labels, and extend mainly in a curved plane, called the first plane here, comprising the axial direction DA and the circumferential direction DC.

As shown in FIG. 5, which is a section view of a cascade 80 in a section plane parallel to the first plane, each cascade 80 comprises a frame 81 inside which extend first partitions 82 in the circumferential direction DC and first transverse partitions 83 in the axial direction DA. The frame 81, the first partitions 82 and the first transverse partitions 83 have a height in the radial direction DR comprised between 10 mm and 300 mm.

The thickness of the first partitions 82 is comprised between 0.5 mm and 5 mm to be sufficiently thick to withstand the loads to which they are subjected, but also as thin as possible to minimize the mass and the head losses in the cascade.

The first partitions 82 are azimuthal partitions intended to orient the gas flow F toward the outside of the nacelle 2 and upstream of the turbomachine 1 for the reversal of thrust when the thrust reverser device is activated. The first transverse partitions 83 are axial partitions intended to define, with the first partitions 82, first cavities 84 for the absorption of acoustic waves generated by the turbomachine, when the thrust reverser device is inactive.

The distance in the circumferential direction DC separating two first transverse partitions 83 adjacent to one another is equal to the distance in the axial direction DA separating two first partitions 82, to thus favor acoustic propagation in plane waves inside the cavities.

The cascade 80 comprises, in the axial direction DA of the turbomachine 1 on which the device 70 is mounted, a first axial end 810 and a second axial end 812. As illustrated in FIGS. 3 and 4, the second axial end 812 of the cascades 80 is fixed to a downstream portion 22 of the nacelle 2, movable with respect to an upstream portion 21 of the nacelle 2.

Housed in the upstream portion 21 of the nacelle 2 of the turbomachine 1, the thrust reverser device 70 comprises a plurality of casings 71 assembled to form a panel ring. The ring can have a cylindrical base or a polygonal base, the casings 71 extending respectively either in a curved plane comprising the axial direction DA and the circumferential direction DC of the turbomachine 1, or in a straight plane comprising the axial direction DA and a direction tangent to the circumferential direction DC.

In the embodiments illustrated, the casing's 71 are curved to facilitate the explanation and the labels, and extend mainly in a curved plane comprising the axial direction DA and the circumferential direction DC.

Each casing 71 includes successively in the radial direction DR moving away from the axis of revolution, a perforated wall 72, a porous interface 77, a housing 75 configured to accommodate the cascade 80, and an acoustically reflecting wall 73. The porous interface 77 is glued to the perforated wall 72 inside the casing 71 and the housing 75 extends, in the radial direction DR, between the porous interface 77 and the acoustically reflecting wall 73.

Acoustically reflecting wall 73 may comprise a stack of a plurality of layers of at least two different materials. (See FIGS. 13-14.)

The casing 71 also comprises an opening 76 communicating with the housing 75, the opening extending in a plane comprising the radial direction DR and the circumferential direction DC at an axial end of the casing 71 facing the downstream portion 22 of the nacelle 2.

When thrust reversal is inactive, the thrust reverser device 70 is in a first position illustrated in FIG. 3 in which the cascade 80 is positioned in the housing 75 of the casing 71.

When thrust reversal is activated, the thrust reverser device 70 is in a second position illustrated in FIG. 4 in which the cascade 80 is extracted from the casing 71 in the axial direction DA in translation with the downstream portion 22 of the nacelle, leaving the housing 75 free, at least in part.

As shown in FIG. 6 which is a front view in the radial direction DR of the perforated wall 72 of the thrust reverser device 70 of FIGS. 3 and 4, the perforated wall comprises a plurality of orifices 722 and first wall strips 724 with no orifices and second wall strips 726 with no orifices and orthogonal to the first wall strips 724.

When the device 70 is mounted on the turbomachine 1, the first wall strips 724 extend in the circumferential direction DC and the second wall strips 726 extend in the axial direction DA.

The wall strips 724 and 726 thus separate the matrix groups of orifices 723, each group 728 being in fluid communication with a single cavity 84 of the cascade 80.

The perforated wall 72 is configured so that the first wall strips 724 are aligned with the first partitions 82 and the second wall strips 726 are aligned with the second partitions 83 when the device 70 is in the first position, to thus optimize sealing of the cavities 84.

In addition, the porous interface 77 is formed of several layers of porous material and has a thickness E in the radial direction DR comprised between 0.2 mm and 2 mm to improve the interface between the movable cascade 80 and the perforated wall 72 by ensuring better sealing while still facilitating the sliding of the cascade 80 in the housing 75 during translations.

A layer of porous material of the porous interface 77 can comprise a web or a foam or a material with a cellular structure. (See FIGS. 15A-15C.)

When the thrust reverser device 70 is in its first position as illustrated in FIG. 3, the first cavities 84 thus form resonant cavities, or acoustic treatment cells, due to the acoustically reflecting wall 73 and to the first and second partitions 82 and 83.

In addition, as shown in FIG. 5, the casing 71 can comprise a sealing span 88 having a rectangular shape in a plane comprising the axial direction DA and the circumferential direction DC. The sealing span 88 is mounted on the porous interface 77 between the thrust reverser cascade 80 and the porous interface 77. The sealing span 88 is formed on the porous interface 77 so as to extend along the first and second partitions 82 and 83 of the cascade 80 when the device 70 is in the first position, to form a sealed connection with the porous interface 77.

Schematic section views are shown in FIGS. 7 and 8 in a plane comprising the axial direction and the radial direction of a cascade type thrust reverser device 70 mounted on an aircraft turbomachine according to a second embodiment of the invention, and respectively in a position in which the thrust reversal is inactive and in a position in which the thrust reversal is activated.

In FIGS. 7 and 8, the turbomachine 1 comprises this time a thrust reverser device 70 which can operate according to the operation described in FIGS. 1A and 1B.

The second embodiment differs from the first embodiment in that the cascade 80 is secured to the upstream portion 21 of the nacelle 2 of the turbomachine 1 and the casing 71 is made in the downstream portion 22 of the nacelle 2.

The casing 71 comprises an opening 76 communicating with the housing 75, the opening extending in a plane comprising the radial direction DR and the circumferential direction DC at an axial end of the casing 71 facing the upstream portion 21 of the nacelle 2.

When the thrust reversal is inactive, the thrust reverser device 70 is in a first position illustrated in FIG. 7, in which the cascade 80 is positioned in the housing 75 of the casing 71.

The sealed frame 88 is positioned in the housing between the perforated wall 72 and the cascade 80 when the cascade type thrust reverser device 70 is inactive, on the periphery of the perforated wall 72 in the first plane. (See FIGS. 13-14.)

When the thrust reversal is activated, the thrust reverser device 70 is in a second position illustrated in FIG. 8 in which the cascade 80 is extracted from the casing 71 in the axial direction DA, the casing 71 being in translation with the downstream portion 21 of the nacelle 2, leaving the housing 75 free at least in part.

Schematic section views are shown in FIGS. 9 and 10 in a plane comprising the axial direction DA and the radial direction DR of a cascade type thrust reverser device mounted on an aircraft turbomachine 1 according to a third embodiment of the invention and respectively in a position in which the thrust reversal is inactive and in a position in which the thrust reversal is activated.

As for the first embodiment, in the third embodiment illustrated in FIGS. 9 and 10, the turbomachine 1 comprises a thrust reverser device 70 which can operate according to the operation described in FIGS. 2A and 2B. The turbomachine 1 comprises a nacelle 2 with axial symmetry around an axis X defining an axial direction DA, a radial direction DR and a circumferential direction DC.

The third embodiment differs from the first embodiment in that the casing 71 also comprises an outer wall 712, compression springs 78 cooperating with the acoustically reflecting wall 73 and an actuator 79 configured to disengage the acoustically reflecting wall 73 from the cascade 80 when the device 70 is out of its first position.

The outer wall 712 of the casing 71 is positioned at a radially outer end of the casing 71. The compression springs 78 are mounted between the outer wall 712 and the acoustically reflecting wall 73 and exert a radially inner force to press the acoustically reflecting all 73 against the cascade 80 when the device 70 is in the first position, and thus ensure better sealing and optimize the acoustic treatment. The terms "inner" and "outer" are used here with reference to the radial direction DR.

The actuator 79 comprises a first beveled surface 792 on the first axial end 810 of the cascade 80 protruding radially from the axial end 810 of the frame 81 of the cascade 80 so as to extend radially outward beyond the first and second partitions 82 and 83 of the cascade 80.

The acoustically reflecting wall 73 comprises a first axial end 732 and a second axial end 734 opposite to the first axial end 732. The first axial end 732 faces the upstream portion 21 of the nacelle 2, while the second axial end 734 faces the downstream portion 22 of the nacelle 2. In other words, the first axial end 732 corresponds to an upstream end while the second axial end 734 corresponds to a downstream end of the acoustically reflecting wall 73.

The actuator 79 comprises a second beveled surface 793 on the second axial end 732 of the acoustically reflecting wall 73. The second beveled surface 793 cooperates with the first beveled surface 792 when the device 70 is in the first position, to allow the acoustically reflecting wall 73 to be supported in the radial direction DR against the cascade 80. The first beveled surface 792 and the second beveled surface 793 are parallel to one another and each form an angle of 45° with the first plane, i.e. with a plane comprising the axial direction DA and the circumferential direction DC.

The second beveled surface 793 also cooperates with the first beveled surface 793 to allow the cascade 80 to be withdrawn from the housing 75 when the device 70 is extracted from its first position. The actuator 79 causes a compression of the springs 78 and an outward movement of the acoustically reflecting wall 73 in the radial direction DR until the entire cascade 80, and more particularly the first beveled surface 792, can pass under the acoustically reflecting wall 73 and thus allow the extraction of the cascade 80 out of the housing 75.

Schematic section views are shown in FIGS. 11 and 12, in a plane comprising the axial direction DA and the radial direction DR of a cascade type thrust reverser device mounted on an aircraft turbomachine 1 according to a fourth embodiment of the invention, and respectively in a position in which the thrust reversal is inactive and in a position in which the thrust reversal is activated.

The fourth embodiment differs from the third embodiment illustrated in FIGS. 9 and 10 in that the cascade 80 is secured to the upstream portion 21 of the nacelle 2 of the turbomachine 1 and the casing 71 is made in the downstream portion 22 of the nacelle 2.

In the fourth embodiment, the actuator 79 is located at the downstream ends. The first beveled surface 792 is at the second axial end 812 of the frame 81 of the cascade 80 and the second beveled surface 793 of the actuator 79 is positioned at the second axial end 734.

The invention thus supplies a cascade type thrust reverser which allows both reorienting the air flow upstream of the turbomachine outside the nacelle and minimizing the head losses through the cascade when the thrust reversal is activated, and maximizing the effectiveness of acoustic absorption when the thrust reversal is inactive.

The invention claimed is:

1. A cascade type thrust reverser device for a turbomachine of an aircraft, the cascade type thrust reverser device comprising a thrust reverser cascade and a casing, the thrust reverser cascade extending in a first plane defining a first direction and a second direction and including first partitions positioned successively in the first direction and parallel to one another, second partitions intersecting said first partitions and each extending in planes parallel to one another and parallel to the first direction, and cavities each defined by two first partitions and two second partitions, the casing comprising an opening extending in a plane orthogonal to said first direction and a housing wherein the thrust reverser cascade can be inserted in said first direction via said opening, and the casing and said thrust reverser cascade being in relative translation with respect to one another in the first direction between a first position of the cascade type thrust reverser device in which the thrust reverser cascade is entirely positioned in the housing and a second position of the cascade type thrust reverser device in which said thrust reverser cascade is at least partially outside said housing,
wherein the casing comprises an acoustically reflecting wall, and a perforated wall intended to be in contact with an air flow and to be positioned between said air flow and the thrust reverser cascade when the cascade type thrust reverser device is in the first position, the perforated wall including a plurality of orifices and a plurality of wall strips with no orifices and intended to face the first partitions of the thrust reverser cascade when the cascade type thrust reverser device is in the first position, at least one orifice being positioned between two successive wall strips in the first direction and facing a cavity when the cascade type thrust reverser device is in the first position,
the thrust reverser cascade is positioned between the acoustically reflecting wall and the perforated wall when the cascade type thrust reverser device is in the first position, wherein the acoustically reflecting wall, the perforated wall and the thrust reverser cascade forming an acoustic panel with said cavities forming resonant cavities when the cascade type thrust reverser device is in the first position.

2. The cascade type thrust reverser device according to claim 1, wherein the casing also comprises a porous interface formed by at least one layer of porous material and positioned at the interface between the perforated wall and the cascade when the thrust reverser device is in the first position.

3. The cascade type thrust reverser device according to claim 2, wherein the porous interface has a thickness comprised between 0.2 and 2 mm, the thickness extending in a third direction perpendicular to said first plane.

4. The cascade type thrust reverser device according to claim 2, wherein a layer of porous material of the porous interface comprises a web, a foam, or a material with a cellular structure.

5. The cascade type thrust reverser device according to claim 1, also comprising a sealed frame positioned in the housing between the perforated wall and the thrust reverser cascade when the cascade type thrust reverser device is in the first position, on the periphery of the perforated wall in the first plane.

6. The cascade type thrust reverser device according to claim 1, wherein the distance separating two first partitions in the first direction and the distance separating two second partitions in the second direction each being defined as a function of the frequencies of the sound waves to be treated by said cavities.

7. The cascade type thrust reverser device according to claim 1, wherein the first partitions of the thrust reverser cascade have a height comprised between 10 mm and 300 mm.

8. The cascade type thrust reverser device according to claim 1, wherein the first partitions have a thickness comprised between 0.5 mm and 5 mm.

9. The cascade type thrust reverser device according to claim 1, wherein the acoustically reflecting wall is movable in a third direction orthogonal to said first plane and positioned parallel to the first plane between an outer wall and the thrust reverser cascade when the cascade type thrust reverser device is in the first position, the outer wall being intended to be in contact with a nacelle of the turbomachine when the cascade type thrust reverser device is mounted in the turbomachine.

10. The cascade type thrust reverser device according to claim 9, wherein the acoustically reflecting wall has a thickness in the third direction greater than 2 mm.

11. The cascade type thrust reverser device according to claim 9, wherein the casing comprises elastic means mounted between the outer wall and the acoustically reflecting wall configured to push said acoustically reflecting wall toward the thrust reverser cascade.

12. The cascade type thrust reverser according to claim 1, wherein the acoustically reflecting wall has dimensions at least equal to the dimensions of the thrust reverser cascade in said first plane.

13. The cascade type thrust reverser device according to claim 1, also comprising an actuator configured to disengage the acoustically reflecting wall from the thrust reverser cascade when the cascade type thrust reverser device is in the second position.

14. The cascade type thrust reverser device according to claim 1, wherein the acoustically reflecting wall comprises at least one layer of flexible material.

15. The cascade type thrust reverser device according to claim 10, wherein the acoustically reflecting wall comprises a stack of a plurality of layers of at least two different materials.

16. The cascade type thrust reverser device according to claim 9, wherein the acoustically reflecting wall is made in a single piece.

17. The cascade type thrust reverser device according to claim 1, wherein the thrust reverser cascade is movable and the casing is fixed.

18. The cascade type thrust reverser device according to claim 1, wherein the thrust reverser cascade is fixed and the casing is movable.

19. A turbomachine intended to be mounted on an aircraft, the turbomachine comprising an axially symmetrical nacelle defining an axial direction and a radial direction, the nacelle including a thickness in the radial direction and a housing extending in the axial direction in a thickness of the housing thickness to receive a cascade of a cascade type thrust reverser device,
    wherein the turbomachine comprises a cascade type thrust reverser device according to claim 1, the thrust reverser cascade being positioned, when thrust reversal is not required, in the housing of the nacelle of the turbomachine.

20. An aircraft comprising at least one turbomachine according to claim 19.

\* \* \* \* \*